United States Patent
Mizuno

(10) Patent No.: US 6,404,616 B2
(45) Date of Patent: Jun. 11, 2002

(54) MULTILAYER CERAMIC CAPACITOR

(75) Inventor: Youichi Mizuno, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/741,441

(22) Filed: Dec. 21, 2000

(30) Foreign Application Priority Data

Dec. 24, 1999 (JP) .......................... H11-366890

(51) Int. Cl.⁷ .............................................. H01G 4/228
(52) U.S. Cl. ................... 361/306.3; 361/321.2
(58) Field of Search .................. 361/306.3, 311–312, 361/321.2–321.5, 322; 29/25.41, 25.42

(56) References Cited

U.S. PATENT DOCUMENTS 4,471,406 A  * 9/1984 Sawairi ........................ 361/328
4,959,745 A  * 9/1990 Suguro ........................ 361/311

FOREIGN PATENT DOCUMENTS

JP          10-208969        8/1998

* cited by examiner

Primary Examiner—Anthony Dinkins
(74) Attorney, Agent, or Firm—Lowe Hauptman Gilman & Berner, LLP

(57) ABSTRACT

A multilayer ceramic capacitor comprises a multilayer body having alternate laminated conductor layers and ceramic dielectric layers. The thickness of each of the ceramic dielectric layers is not more than the thickness of each of the conductor layers. Therefore, as a whole, the volume ratio of the conductor layer and flexibility to the thermal shock are increased. Consequently, thermal shock resistance is improved.

11 Claims, 3 Drawing Sheets

| | Thickness of dielectric layer [μm] | Thickness of conductor layer [μm] | Number of laminated layers | Electrostatic capacitance [μF] | Number of created cracks |
|---|---|---|---|---|---|
| Conventional capacitor | 1.8 | 1.5 | 330 | 10.1 | 10/100 |
| Capacitor according to present invention | 1.7 | 2.0 | 300 | 10.1 | 0/100 |

Fig. 5

| | Thickness of dielectric layer [μm] | Thickness of conductor layer [μm] | Number of laminated layers | Electrostatic capacitance [μF] | Number of created cracks |
|---|---|---|---|---|---|
| Conventional capacitor | 1.8 | 1.5 | 330 | 10.1 | 10/100 |
| Capacitor according to present invention | 1.7 | 1.7 | 320 | 10.5 | 0/100 |

MULTILAYER CERAMIC CAPACITOR

BACKGROUND OF THE INVENTION

A conventional multilayer ceramic capacitor comprises a multilayer body made by alternately laminating ceramic dielectric layers and conductor layers, and connecting external electrodes to the conducting layers formed at both ends of the multilayer body. Alternate conductor layers are connected to the external electrodes at both ends such that a first external electrode is connected to every other conductor layer, and a second external electrode is connected to the remaining conductor layers, that is the layers which are not connected to the first external electrode are connected to the second external electrode.

For example, in the case of a multilayer ceramic capacitor with an external size of 2.1 mm×1.25 mm×1.25 mm and an electrostatic capacity of 10 $\mu$F, the number of the laminated conductor layers is 330, the thickness of each ceramic dielectric layer is 1.8 $\mu$m, and the thickness of each conductor layer is 1.5 $\mu$m. That is, the thickness of each ceramic dielectric layer is about 1.2 times the thickness of each conductor layer.

Generally, in a multilayer ceramic capacitor, there are some cases requiring a capacitor with a high resistance to thermal shock. Furthermore, recently, a small-sized multilayer ceramic capacitor with a large capacity has been required. However, in some cases, a conventional multilayer ceramic capacitor has not had sufficient thermal shock resistance. Especially, when attempting to make a small-sized capacitor with a large capacity by increasing the number of laminated layers, in some cases, a sufficient thermal shock resistance has not been obtained.

SUMMARY OF THE INVENTION

It is an object of the present invention to provide a multilayer ceramic capacitor with excellent thermal shock resistance.

In order to attain this object, one aspect of the present invention proposes a multilayer ceramic capacitor comprising a multilayer body having alternate laminated conductor layers and ceramic dielectric layers, wherein each of said ceramic dielectric layers has a thickness not more than the thickness of each of said conductor layers.

In a multilayer ceramic capacitor, generally, the conductor layers have a comparatively higher flexibility to thermal shock than ceramic grain making up the ceramic dielectric layers. Therefore, according to the present invention, the ceramic dielectric layers are not thicker than the conductor layers. Consequently, as a whole, the ratio of the occupation of the conductor layer becomes large, and as a result of this, the resistance to thermal shock is improved.

Furthermore, another aspect of the present invention proposes a multilayer ceramic capacitor comprising a multilayer body having alternate laminated conductor layers and ceramic dielectric layers, wherein said ceramic dielectric layers comprise (1) ceramic grains, (2) a secondary phase that is between said ceramic grains, and (3) a part in which said ceramic grains do not exist between said opposite conductor layers and which includes only said secondary phase.

In a multilayer ceramic capacitor, generally, the secondary phase that is between the above described ceramic grains has a comparatively higher flexibility to thermal shock than the ceramic grains making up the ceramic dielectric layer. Therefore, according to the present invention, the part including only the above described secondary phase relieves thermal shock, and therefore, thermal shock resistance is improved.

The objects, constitution, and effects of the present invention other than those in the above description will be clear by the following detailed description.

BRIEF DESCRIPTION OF THE DRAWINGS

FIG. 5 is a table including results of heat resistance tests of the capacitor illustrated in FIG. 4.

DESCRIPTION OF THE PREFERRED EMBODIMENTS

First Embodiment

Figure 1:
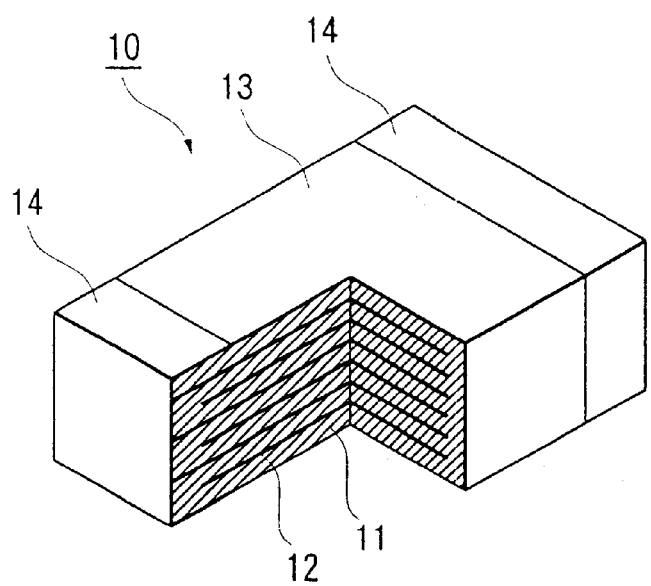
FIG. 1 is a partially cut perspective view of a multilayer ceramic capacitor.

A multilayer ceramic capacitor according to the first embodiment of the present invention will be described by referring to the drawings. FIG. 1 is a partially cut illustration of a first embodiment of a multilayer ceramic capacitor, and FIG. 2 is an enlarged cross sectional view of the multilayer ceramic capacitor of FIG. 1.

As shown in FIG. 1, multilayer ceramic capacitor 10 comprises an approximately rectangular multilayer body 13 made by alternately laminating ceramic dielectric layers 11 and conductor layers 12. External electrodes 14 formed at both ends of the multilayer body 13 are connected to the above described conductor layers 12. Conductor layers 12 are alternately connected to the external electrodes 14 at both ends. That is, a first external electrode 14 is connected to every other conductor layer 12, and a second external electrode 14 is connected to the remaining conductor layers 12, that is the conductor layers not connected to the first external electrode 14.

The ceramic dielectric layer 11 is made of a ceramic sintered body having a strong dielectric, for example, of the BaTiO$_3$ family. Furthermore, the conductor layer 12 is made of a metal material, for example, a noble metal such as Pd, Ag, or Au, or a base metal such as Ni or Cu. The multilayer body 13 is baked so that a plurality of ceramic green sheets on which conductive paste is printed are laminated and the baking operation causes the ceramic green sheets to be sintered and the ceramic dielectric layers 11 to be formed. Furthermore, this baking operation causes the conductive paste to be sintered and the conductor layers 12 to be formed. The external electrode 14 is made of a metal material such as Ni or Ag.

Figure 2:
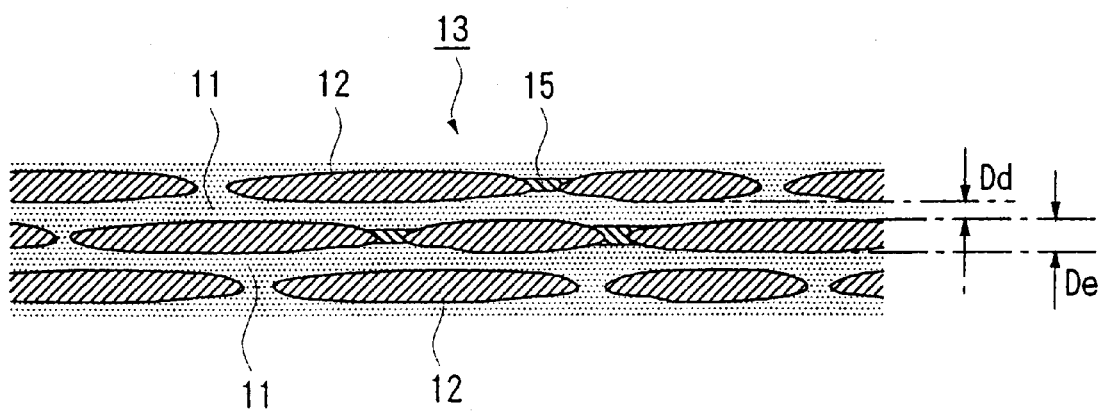
FIG. 2 is an enlarged cross sectional view of one embodiment of the multilayer ceramic capacitor of FIG. 1.

As shown in FIG. 2, this multilayer ceramic capacitor 10 is such that the thickness Dd of the ceramic dielectric layer 11 is not more than the thickness De of the conductor layer 12. The thickness Dd of the ceramic dielectric layer 11 is preferably about 70% to 100% of the thickness De of the conductor layer 12, and more preferably about 85% to 100%. These dimensions enable conductor layers 12 to have a higher flexibility to thermal shock than conductor layers having relative thicknesses outside of the stated range.

As illustrated in FIG. 2 conductor layers 12 are broken, i.e., include gaps. Each of layers 12 has a non-uniform thickness because of an aggregation of metal grains included in the conductive paste forming the conductor layer 12. As a result, there is a region in planes including layer 12 where there is no conductor, i.e., there is a gap in planes including layers 12 where there are gaps in the conductor. The gaps in conductor layer 12 are filled with a secondary phase 15 in the ceramic dielectric layer 11.

Next, one example of the manufacturing method of this multilayer ceramic capacitor 10 is described. First, a given amount of organic binder, organic solvent, or water is mixed and stirred in a dielectric ceramic material made by mixing $BaTiO_2$ or the like as a main material and $SiO_2$, rare earth oxide, $Mn_3O_4$ or the like as an additional substance to obtain a ceramic slurry. Next, this ceramic slurry is subjected to a tape molding method, such as a doctor blade method, to form a ceramic green sheet.

The conductive paste with a given shape is then printed on this ceramic green sheet by e.g., a screen printing method, an intaglio printing method, a letterpress printing method or the like. The conductive paste is coated on the ceramic green sheets so that the thickness of the conductor layer after the sintering operation is thicker than that of the ceramic dielectric layer.

Next, the ceramic green sheets on which the conductive paste is printed are laminated and pressed by using a press device to obtain ceramic multilayer body 13. Next, ceramic multilayer body 13 is cut to have a size for a part unit to obtain a multilayer chip. Next, this multilayer body 13 is baked under a given heat condition and atmospheric condition to obtain a sintered body. Finally, external electrodes 14 are formed at both ends of the sintered body 13 by a dip method or the like to obtain multilayer ceramic capacitor 10.

Figures 3, 4:
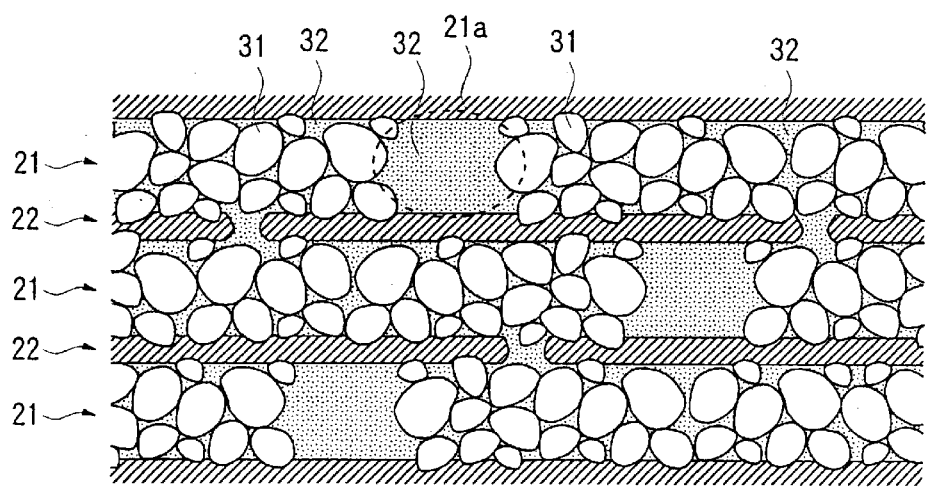
FIG. 3 is a table including the results of heat resistance tests of the capacitor illustrated in FIG. 2.
FIG. 4 is an enlarged cross sectional view of a second embodiment of the multilayer ceramic capacitor of FIG. 1.

In this embodiment, a multilayer ceramic capacitor as described below was prepared. The size of the external shape is 2.1 mm×1.25 mm×1.25 mm, the dielectric constant of the ceramic dielectric layer is 3800, the average thickness of the ceramic dielectric layers 11 is 1.7 $\mu$m, the average thickness of the conductor layers 12 is 2.0 $\mu$m, the number of laminated conductor layers is 300, the electrostatic capacitance is 10 $\mu$F, and the material of the conductor layers is Ni. A thermal shock resistance test was applied to this multilayer ceramic capacitor. The test was performed by dipping the multilayer ceramic capacitor in a dissolved solder vessel for five seconds at 350° C., resulting in a crack that was observed by the eye. The result of this test for 100 capacitors is shown in FIG. 3, which indicates the number of created cracks in 100 samples. From this table, the multilayer ceramic capacitor 10 according to this embodiment has a better thermal shock resistance than the previously described conventional multilayer ceramic capacitor.

Thus, in the multilayer ceramic capacitor 10 according to this embodiment, the conductor layers 12 having a comparatively higher flexibility to the thermal shock are formed so they are thicker than the ceramic dielectric layer 11, and therefore, as a whole, capacitor 10 has excellent thermal shock resistance. Especially, in the case where each layer is thinned and the number of laminated layers is increased to attain miniaturization and a large capacity, this multilayer ceramic capacitor 10 has excellent thermal shock resistance.

Second Embodiment

A multilayer ceramic capacitor according to the second embodiment of the present invention is described by referring to FIG. 4 of drawings, FIG. 4 is an enlarged cross sectional view of the second embodiment of the multilayer ceramic capacitor.

The multilayer ceramic capacitor of FIG. 4 is similar to the above described first embodiment and comprises an approximately rectangular multilayer body made by alternately laminating ceramic dielectric layers 21 and conductor layers 22. External electrodes formed at both ends of the multilayer body are connected to conductor layers 22. Alternate conductor layers 22 are connected to the external electrodes at opposite ends of the multilayer body. That is, a first external electrode is connected to every other conductor layer 22, and a second external electrode is connected to the remaining conductor layers 22, that is the conductor layers that are not connected to the first external electrode.

The ceramic dielectric layer 21 is made of a ceramic sintered body having a strong dielectric, for example, of the $BaTiO_3$ family. Furthermore, the conductor layer 12 is made of a metal material, for example, a noble metal such as Pd, Ag, or Au, or a base metal such as Ni or Cu. The multilayer body 13 is baked so that a plurality of ceramic green sheets on which conductive paste is printed are laminated and the baking operation causes the ceramic green sheets to be sintered and the ceramic dielectric layers 11 to be formed. Furthermore, this baking operation causes the conductive paste to be sintered and the conductor layers 12 to be formed. The external electrode 14 is made of a metal material such as Ni or Ag.

Generally, each of ceramic dielectric layers 21 many ceramic grains, e.g., grains 31, and a secondary phase 32 that exists in a gap between the ceramic grains. The secondary phase is an additional material added to the raw material while the ceramic is baked, or a reaction product of the additional material and the ceramic grain. This secondary phase has a higher flexibility to thermal shock than the ceramic grain. The ceramic dielectric layers are generally in the state where adjacent ceramic grains are closely connected through the whole region of layer 21.

The multilayer ceramic capacitor according to the embodiment shown in FIG. 4 is such that the ceramic dielectric layer 21 includes a part 21a in which no ceramic grain 31 exists through the space between the opposite conductor layers 22 and which includes only the secondary phase 32. Here, the size of the part 21a including only the secondary phase 32, that is, the distance between the opposite ceramic grains is not less than the thickness of the ceramic dielectric layer. Furthermore, it is preferable for one ceramic dielectric layer 21 to include about 0% to 15% of part 21a having only the secondary phase 32, and it is more preferable for layer 21 to have about 0% to 5% of part 21a. Furthermore, the percentage of the ceramic dielectric layer 21 having part 21a including only the secondary phase 32 to the total ceramic dielectric layer 21 is preferably about 10% to 90%, and more preferably about 15% to 30%.

FIG. 4 shows a state where the conductor layer 22 includes a gap. This is the state where the thickness of the conductor layer 22 becomes non-uniform because of an aggregation of metal grains included in the conductive paste forming the conductor layer 22 and as a result, a part where no conductor is formed is created. That is, conductor layer 22 is formed so it has a non-uniform thickness. The part where the conductor layer 22 is broken is filled with the secondary phase 32 included in the ceramic dielectric layer 21.

Next, one example of the manufacturing method of the multilayer ceramic capacitor of FIG. 4 is described. First, a given amount of organic binder, organic solvent, or water is mixed and stirred in a dielectric ceramic material to obtain a ceramic slurry. The dielectric ceramic material is made by mixing a main material of the barium titanate family, such as $BaTiO_3$ and an additional composition such as $SiO_2$, a rare earth oxide, or $Mn_3O_4$. Part of this additional composition forms the secondary phase during baking to be described later. The percentage of this additional composition to be mixed with the main material is preferably about 1% to 10%, and more preferably about 3% to 7%. Furthermore, the average grain diameter of the main material is preferably 0.2 to 1.5 $\mu$m, and more preferably 0.2 to 1.0 $\mu$m.

Next, this ceramic slurry is subjected to a tape molding method, such as the doctor blade method, and the ceramic green sheet is formed. Next, on this ceramic green sheet, the conductive paste with a given shape is printed, e.g., by the screen printing method, the intaglio printing method, the letterpress printing method or the like. Next, the ceramic green sheets where the conductive paste is printed are laminated and pressed by using a press device to obtain the ceramic multilayer body.

Next, the ceramic multilayer body is cut to have a size for a part unit to obtain a multilayer chip. Next, this multilayer chip is baked under a given heat condition and a given atmospheric condition to obtain a sintered body. Finally, external electrodes are formed at both ends of the sintered body by a dip method or the like to obtain a multilayer ceramic capacitor.

In the embodiment of FIG. 4, a multilayer ceramic capacitor as described below was prepared. The size of the external shape is 2.1 mm×1.25 mm×1.25 mm, the dielectric constant of the ceramic dielectric layer is 3800, the average grain diameter of the ceramic grain is 0.35 $\mu$m, the average thickness of the ceramic dielectric layer is 1.7 $\mu$m, the average thickness of the conductor layer is 1.7 $\mu$m, the number of the laminated conductor layers is 320, the electrostatic capacitance is 10.5 $\mu$F, and the material of the conductor layer is Ni. The thermal shock resistance test was applied to this multilayer ceramic capacitor. The test was performed by dipping the multilayer ceramic capacitor in a dissolved solder vessel for five seconds at 350° C., and the creation of a crack was observed by the eye. The result of this test is shown in FIG. 5. The table of FIG. 5 shows the number of created cracks in 100 samples. From the table of FIG. 5, the multilayer ceramic capacitor according to the embodiment of FIG. 4 has a better thermal shock resistance than that of the above described conventional multilayer ceramic capacitor.

In the multilayer ceramic capacitor according to the embodiment of FIG. 4, the ceramic dielectric body 21 includes a part 21a made of only the secondary phase that is comparatively flexible to the thermal shock, and therefore, as a whole, has excellent thermal shock resistance. That is, this part 21a made of only the secondary phase relieves thermal stress. Especially, in the case where each layer is thinned and the number of laminated layers is increased to attain miniaturization and a large capacity, this multilayer ceramic capacitor has excellent thermal shock resistance. Especially, when using a material including Si as an additional matter, the secondary phase becomes glassy, and therefore, it is preferable in view of the relief of the thermal shock.

Herein, the embodiments according to the present invention are illustrative and not limited. The scope of the present invention is shown by the accompanying claims, and all the deformed examples included in the meanings of those claims are included in the present invention.

For example, in the above described respective embodiments, as a material of the ceramic dielectric layer, a ceramic material powder whose main material is $BaTiO_3$ and whose additional matter is $SiO_2$, a rare earth oxide, or $Mn_3O_4$ is shown as an example, but the present invention is not limited to these materials. Examples of other possible main materials are: $BaTiO_3$, $Bi_4Ti_3O_{12}$, (Ba, Sr, Ca)$TiO_3$, (Ba, CA) (Zr, Ti)$O_3$, (Ba, Sr, Ca) (Zr, Ti)$O_3$, Ba(Ti, Sn)$O_3$. Possible examples of additional compositions are MgO, glasses of the Li family, and glasses of the B family.

What is claimed is:

1. A multilayer ceramic capacitor comprising a multilayer body including alternate laminated conductor layers and ceramic dielectric layers, wherein each of said ceramic dielectric layers has a thickness not more than the thickness of each of said conductor layers.

2. The multilayer ceramic capacitor according to claim 1, wherein each of said ceramic dielectric layers (a) is at least 70% as thick as each of said conductor layers and (b) no thicker than each of the conductor layers.

3. The multilayer ceramic capacitor according to claim 1, wherein each of said conductor layers has a non-uniform thickness.

4. The multilayer ceramic capacitor according to claim 1, wherein said ceramic dielectric layer comprises ceramic grains and a secondary phase that exists between said ceramic grains.

5. A multilayer ceramic capacitor comprising a multilayer body including alternate laminated conductor layer and a ceramic dielectric layer, wherein said ceramic dielectric layer comprises ceramic grains and a secondary phase that exists between said ceramic grains, and includes a part having (a) none of said ceramic grains between opposite conductor layers and (b) only said secondary phase.

6. The multilayer ceramic capacitor according to claim 5, wherein

10% or more and 90% or less of all of said ceramic dielectric layers include said part having only said secondary phase.

7. The multilayer ceramic capacitor according to claim 5, wherein, said secondary phase comprises Si.

8. The multilayer ceramic capacitor according to claim 5, wherein, said conductor layer has a non-uniform thickness.

9. A multilayer ceramic capacitor comprising a multilayer body including alternate laminated conductor layer and ceramic dielectric layer, wherein the ceramic layer has a thickness not more than the thickness of said conductor layer and said conductor layer has a non-uniform thickness.

10. A multilayer ceramic capacitor comprising a multilayer body including alternate laminated conductor layer and ceramic dielectric layer, wherein the ceramic layer has a thickness not more than the thickness of said conductor layer, and said ceramic dielectric layer comprises ceramic grains and a secondary phase that exists between said ceramic grains.

11. A multilayer ceramic capacitor comprising a multilayer body including alternate laminated conductor layers and ceramic dielectric layers, wherein each of said ceramic dielectric layers comprises ceramic grains and a secondary phase that exists between said ceramic grains, and includes a part having (a) none of said ceramic grains between opposite conductor layers and (b) only said secondary phase.

* * * * *